United States Patent [19]
Nishiyama

[11] Patent Number: 5,210,706
[45] Date of Patent: May 11, 1993

[54] DEVICE FOR MEASURING A PHYSICAL FORCE

[75] Inventor: Yoshihisa Nishiyama, Shizuoka, Japan

[73] Assignee: Tokyo Electric Co. Ltd., Tokyo, Japan

[21] Appl. No.: 932,911

[22] Filed: Aug. 20, 1992

Related U.S. Application Data

[63] Continuation of Ser. No. 571,774, Aug. 22, 1990, abandoned.

[30] Foreign Application Priority Data

Aug. 25, 1989 [JP] Japan .................................. 1-219336

[51] Int. Cl.[5] ............................................. G06F 15/31
[52] U.S. Cl. .................................. 364/574; 177/25.13; 364/567; 364/572
[58] Field of Search ............... 177/25.13, 25.15, 25.18, 177/25.14, 2, 211, 185; 364/567, 466, 572, 574, 724.01

[56] References Cited

U.S. PATENT DOCUMENTS

| | | | |
|---|---|---|---|
| 3,937,287 | 2/1976 | Pryor et al. | 177/25.15 |
| 4,135,392 | 1/1979 | Young | 177/211 |
| 4,624,331 | 11/1986 | Naito | 177/185 |
| 4,660,160 | 4/1987 | Tajima et al. | 364/567 |
| 4,705,126 | 11/1987 | Naito | 177/185 |
| 4,817,026 | 3/1989 | Inoue et al. | 177/185 |
| 4,825,965 | 5/1989 | Inoue et al. | 177/185 |
| 4,951,763 | 8/1990 | Zimmerman et al. | 177/185 |
| 4,967,384 | 10/1990 | Molinar et al. | 364/567 |
| 4,974,679 | 12/1990 | Reuter | 177/185 |

FOREIGN PATENT DOCUMENTS

| | | |
|---|---|---|
| 0216638 | 9/1986 | European Pat. Off. . |
| 27188543A1 | 4/1977 | Fed. Rep. of Germany . |
| 1460587 | 4/1973 | United Kingdom . |
| 2191004 | 5/1987 | United Kingdom . |

Primary Examiner—Kevin J. Teska
Attorney, Agent, or Firm—Frishauf, Holtz, Goodman & Woodward

[57] ABSTRACT

A load cell weighing device has a plurality of load cells. In the device, detection values are respectively output from the load cells. The detection values are digitized by analog-to-digital conversion circuits. Low frequency noise components involved in the digitized detection values are reduced by digital filters. Then, the noise-reduced values are summed to provide weight data.

8 Claims, 4 Drawing Sheets

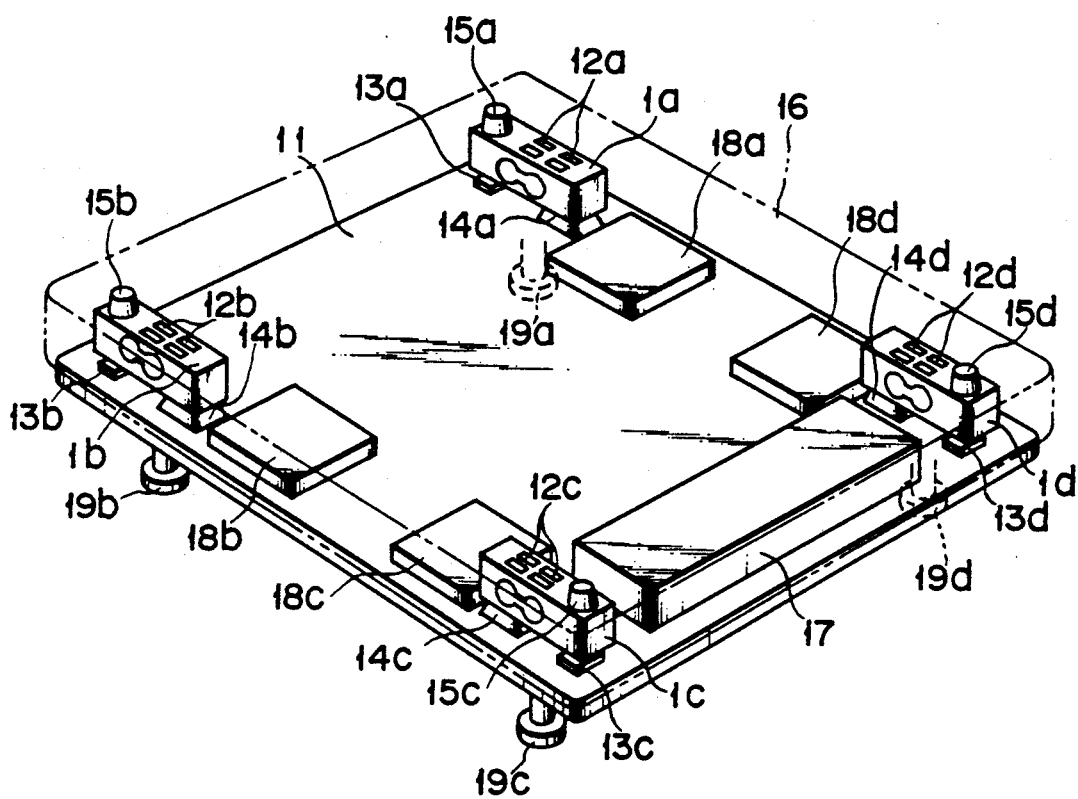
F I G. 2

OUTPUT d5a

OUTPUT d5b

OUTPUT d5c

OUTPUT d5d

TOTAL OF
OUTPUTS
d5a TO d5d

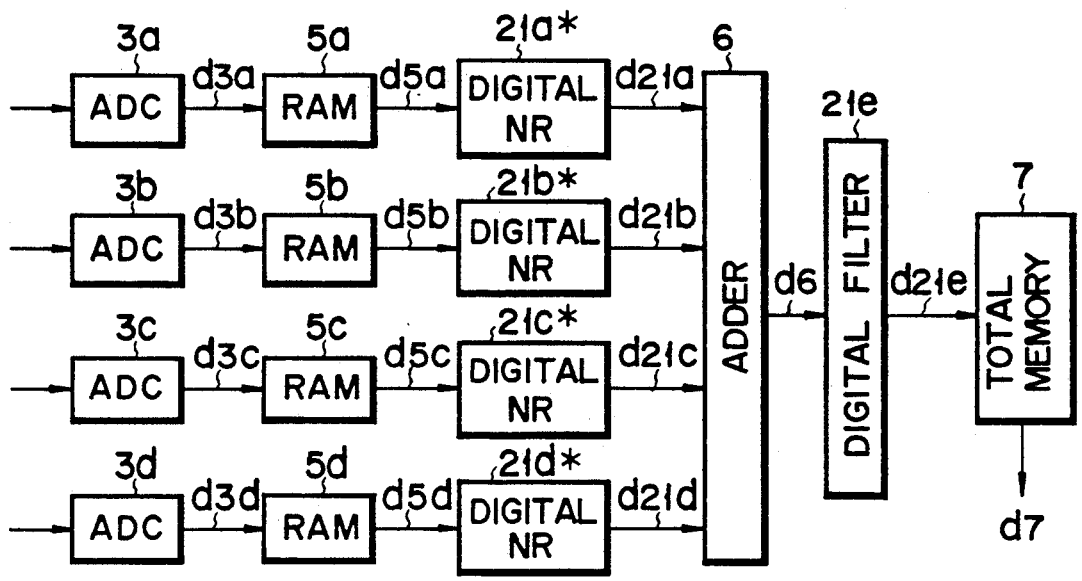
F I G. 4
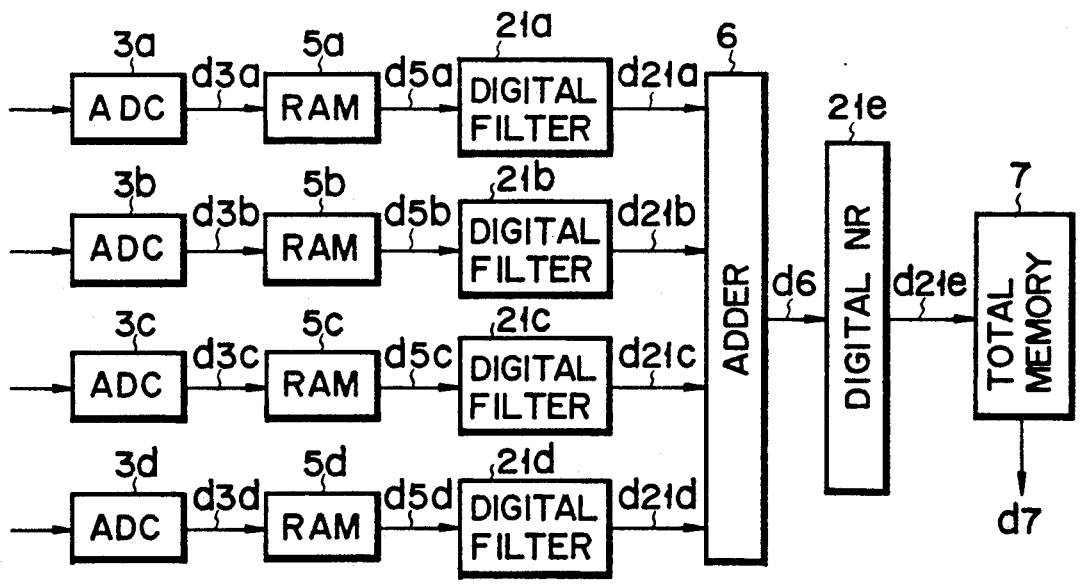
F I G. 5

DEVICE FOR MEASURING A PHYSICAL FORCE

This application is a continuation of application Ser. No. 07/571,774, filed Aug. 22, 1990, now abandoned.

BACKGROUND OF THE INVENTION

1. Field of the Invention

The present invention relates to a device for measuring a physical force, and more particularly, to a digital load cell weight using a plurality of load cells for measuring weight.

2. Description of the Related Art

According to a conventional digital load cell weight, the weight values detected by load cells are respectively amplified, and converted into digital data, via analog-to-digital converters. The digitized detected weight values are then stored in memories. The values stored in the memories are summed to calculate total weight data, and the total weight data is sent to a total memory.

According to the above conventional configuration, however, when the digitized detected values involve low frequency noises, problems occur. More specifically, even if no load is applied to the load cell weight when each detected value of the load cells involves low frequency noises, noise-affected waveforms as shown in FIGS. 3A to 3D are input to the memories. If the values read from these memories are summed, a waveform of data stored in the total memory, which has to be normally zero level for zero weight, becomes one as is shown in FIG. 3E. Such a waveform will degrade the accuracy of weight measuring.

SUMMARY OF THE INVENTION

It is accordingly an object of the present invention to provide a physical force measuring device, typically a load cell weight, which can avoid degradation in the measuring accuracy due to low frequency noises.

To achieve the above object, a measuring device of the invention includes a plurality of load cells; analog-to-digital converting means for converting detection values, output from the load cells, into digital detection values; digital filters for respectively suppressing low frequency noise components in the digital detection values; and arithmetic operation means for summing outputs of the digital filters to provide weight data.

BRIEF DESCRIPTION OF THE DRAWINGS

FIG. 2 is a perspective view of the load cell weight;

FIG. 4 is a block diagram showing a load cell weight according to another embodiment of the present invention; and FIG. 5 is a block diagram showing a load cell weight according to still another embodiment of the present invention.

DETAILED DESCRIPTION OF THE PREFERRED EMBODIMENTS

Figure 1:
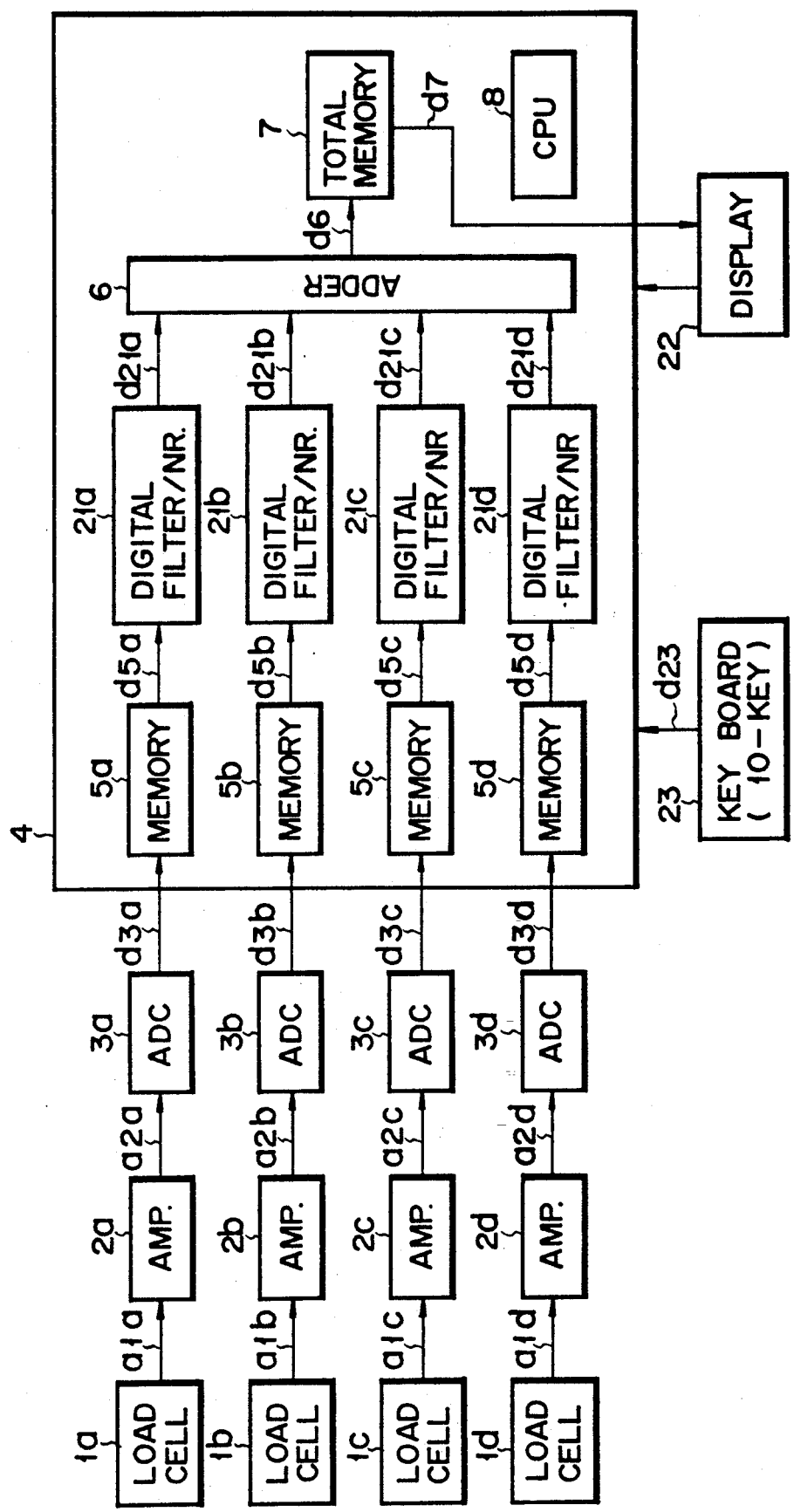
FIG. 1 is a block diagram showing a load cell weight according to an embodiment of the present invention.

Preferred embodiments of this invention will be described with reference to the accompanying drawings. In the description the same or functionally equivalent elements are denoted by the same or similar reference numerals, to thereby simplify the description.

In the following, a load cell weight according to an embodiment of the present invention will be described with reference to the accompanying drawings. Here, the load cell weight represents a device for measuring a physical "weight."

FIG. 2 shows a configuration wherein four load cells are employed. In the figure, the reference numeral 11 denotes a rectangular base body made of aluminum or the like. Load cells $1a$, $1b$, $1c$, and $1d$ are respectively located at the four corners of base body 11. Load cells $1a$, $1b$, $1c$, and $1d$ are set at distortion generating bodies (Roberval mechanism) each having a nearly rectangular figure. The distortion generating body is provided with a figure-eight like through hole at the side thereof. On the thin top-plate over the through hole of each of load cells $1a$, $1b$, $1c$, and $1d$, two pairs of strain gauges $12a$, $12b$, $12c$, and $12d$ are mounted.

Lower ends of load cells $1a$, $1b$, $1c$, and $1d$ are mounted at mounting portions $14a$, $14b$, $14c$, and $14d$, respectively, which are fixed at base body 11. Other lower ends of load cells $1a$, $1b$, $1c$, and $1d$ face overweight stoppers $13a$, $13b$, $13c$, and $13d$, respectively. Other upper ends of load cells $1a$, $1b$, $1c$, and $1d$ are provided with projections $15a$, $15b$, $15c$, and $15d$, respectively. The top end of each of projections $15a$, $15b$, $15c$, and $15d$ abuts on the inner plane of load plate 16 which has an open-box figure and whose size is slightly larger than the size of base body 11. Thus, load plate 16 can freely move along the vertical direction.

Base body 11 is further provided with enclosure cases 17, $18a$, $18b$, $18c$, and $18d$.

In addition, the rear sides of mounting portions $14a$, $14b$, $14c$, and $14d$, fixed at base body 11, are provided with variable-height legs $19a$, $19b$, $19c$, and $19d$, by which base body 11 can be kept horizontal.

The above load cells $1a$, $1b$, $1c$, and $1d$ are respectively connected to electronic circuits shown in FIG. 1.

Detection values $a1a$, $a1b$, $a1c$, and $a1d$ from load cells $1a$, $1b$, $1c$, and $1d$ are respectively amplified through amplifiers $2a$, $2b$, $2c$, and $2d$. Amplified analog values $a2a$, $a2b$, $a2c$, and $a2d$ are respectively converted into digital values $d3a$, $d3b$, $d3c$, and $d3d$, via analog-to-digital converters (ADCs) $3a$, $3b$, $3c$, and $3d$.

Analog-to-digital converters $3a$, $3b$, $3c$, and $3d$ are coupled to microcomputer system 4. Microcomputer system 4 includes memories (such as RAMs) $5a$, $5b$, $5d$, and $5d$ which are respectively connected to analog-to-digital converters $3a$, $3b$, $3c$, and $3d$, and store digital values $d3a$, $d3b$, $d3c$, and $d3d$. Low frequency noise components involved in digital values $d5a$, $d5b$, $d5c$, and $d5d$, respectively read from memories $5a$, $5b$, $5d$, and $5d$, are reduced by digital filters (or digital noise reduction circuits) $21a$, $21b$, $21c$, and $21d$, individually.

Filtered outputs $d21a$, $d21b$, $d21c$, and $d21d$ from digital filters $21a$, $21b$, $21c$, and $21d$ are summed at adder 6, so that the total weight value is calculated. Total output $d6$ from adder 6 is sent to total memory 7.

Incidentally, microcomputer system 4 is connected with display 22 for displaying weight values, etc. and key board (10-key) 23 for inputting data.

The embodiment of FIG. 1 will operate as follows.

An object body (not shown) is placed on load plate 16 when weight measurement is performed. The strains caused at respective load cells $1a$, $1b$, $1c$, and $1d$ are detected as analog signals $a1a$, $a1b$, $a1c$, and $a1d$. The detected values are respectively amplified via amplifiers $2a$, $2b$, $2c$, and $2d$, and then are converted into digital signals $d3a$, $d3b$, $d3c$ and $d3d$ via analog-to-digital converter 3a, 3b, 3c, and 3d. Digital signals d3a, d3b, d3c, and d3d thus converted are stored in memories 5a, 5b, 5c, and 5d. Low frequency noise components involved in the digital signals read from memories 5a, 5b, 5c, and 5d are respectively and independently reduced by digital filters 21a, 21b, 21c, and 21d. Substantially noise-free digital values d21a, d21b, d21c, and d21d are summed at adder 6, and summed value d6 is stored in total memory 7. Value d7 (weight data) stored in memory 7 is displayed at display 22 in terms of "weight."

When a price corresponding to the measured weight is to be displayed, a price for a unit weight is input from 10-key 23. In response to data of the 10-key input and calculated weight data, CPU 8 calculates the product (d7×d23) of the 10-key input with the measured weight, and the calculated product as well as the measured weight are indicated at display 22.

According to the embodiment as mentioned above, various low frequency noises as shown in FIGS. 3A to 3D, which are different for respective load cells, are independently reduced by digital filters 21a, 21b, 21c, and 21d. Consequently, the noise reduction effect of the embodiment is superior to a case wherein only one filter is used for data in the total value as is shown in FIG. 3E.

According to the present invention, low frequency noise components, involved in detected values which are digitized through analog-to-digital converting mean from the outputs of respective load cells, can be independently reduced by digital filters. Thus, the high performance noise reduction ensures a stable and accurate weight measuring.

In the embodiment of FIG. 1, four load cells are used. However, the number of the load cells may be three, or more than four.

Each characteristic of respective digital filters can be determined as follows: First, in the actual device according to an embodiment of the invention, the pattern of noise components as shown in FIGS. 3A to 3D is obtained by experience. Second, the tendency of the actual noise pattern for each load cell is detected from the result of the experience, so that the filtering parameters of each digital filter are determined. Then, a combination of respective digital filters provides a high performance noise reduction which is superior to the performance of only one digital filter.

The above-mentioned digital filters can be replaced with digital noise reduction circuits 21a*-21d* shown in FIG. 4.

Figure 3A:
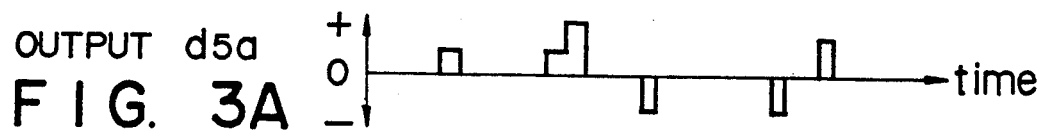
FIGS. 3A to 3E illustrate waveforms of low frequency noises which vary with time.
Figure 3B:
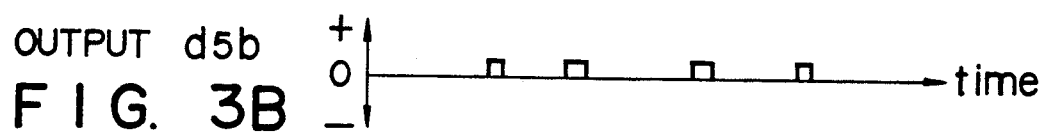
Figure 3C:
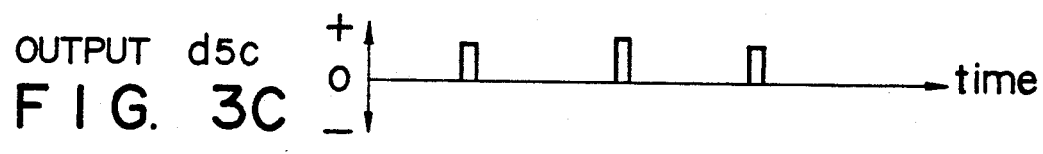
Figure 3D:
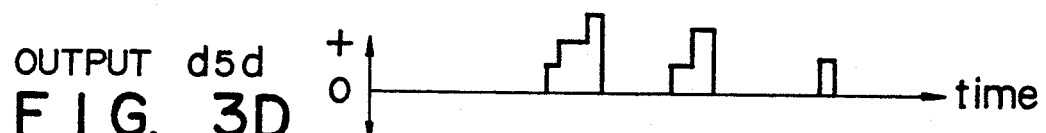
Figure 3E:
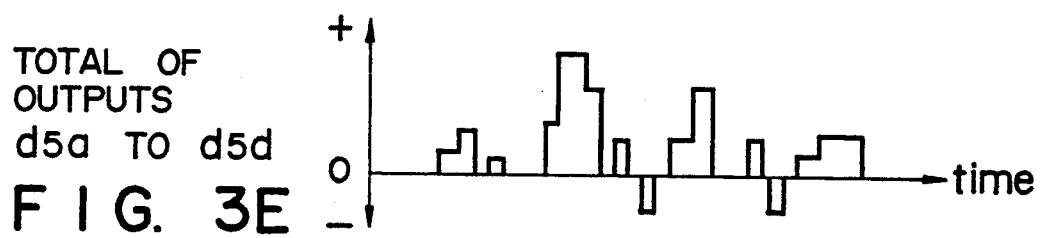

Digital noise reduction circuit 21a* performs the following operation, when the noise as is shown in FIG. 3A should be reduced.

More specifically, output d3a(t1) of ADC 3a obtained during a certain period (t1) is stored in memory (RAM) 5a and digital noise reduction circuit 21a*. During next period (t2), output d3a(t2) of ADC 3a is stored in memory 5a and is sent to circuit 21a* in which average d3a(t12) of preceding output d3a(t1) and new output d3a(t2) is calculated. Further, during subsequent period (t3), output d3a(t3) of ADC 3a is stored in memory 5a and is sent to circuit 21a* in which average d3a(t123) of preceding average d3a(t12) and new output d3a(t3) is calculated.

The above average calculations are repeated (i.e., output d3a is integrated with time). Then, random noise components of all periods are reduced with a rate of N (N is the number of the average calculations), while actual weight data, which is not a random variable, is not reduced with the above average calculations.

Each of remaining outputs d3b, d3c, and d3d is subjected to the above average calculations.

Sum d6 of the above averaged outputs is naturally low noise. However, if the noise has to be further reduced, another digital filter 21e may be additionally used for sum d6. Or, as shown in FIG. 5, one digital noise reduction circuit 21e may be additionally used for sum d6 of outputs d21a–d21d from the digital filters.

The configuration of a load cell weight should not be limited to that shown in FIG. 2. Another configuration of a load cell weight, for example, as is disclosed in Japanese Patent Disclosure (kokai) No. 55-3520, can be used for the weighing device of the present invention.

The following U.S. Patent discloses a relevant art with respect to digital processing of the present invention:

U.S. Pat. No. 4,660,160 issued on Apr. 21, 1987 (Tajima et al.), "ELECTRONIC WEIGHING DEVICE HAVING LABEL PRINTER WITH DATA STABILITY CHECK".

All disclosures of the above U.S. Patent are now incorporated in the specification of the present invention.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A force measuring device comprising:
    means for converting force into a plurality of digital signals respectively corresponding to different points at which the force is detected, and including a plurality of load cells respectively positioned at said different points to provide analog output signals, means for transmitting force to each of said load cells, means for respectively converting said analog output signals provided by said plurality of load cells into said plurality of digital signals, and a memory coupled to receive said plurality of digital signals;
    means coupled to said memory for reducing noise components contained in digital signals retrieved from said memory, and including a plurality of digital filters for respectively receiving said plurality of digital signals retrieved from said memory to generate therefrom a plurality of low noise digital signals, said digital filters having attenuation characteristics respectively corresponding to noise components of said retrieved digital signals; and
    means for combining said plurality of low noise digital signals to provide a combined signal representing said force.

2. The force measuring device of claim 1, wherein said memory includes means to store said digital signals for a prescribed period of time.

3. The force measuring device of claim 1, wherein said combining means includes a memory having means for temporarily storing said combined signal.

4. The force measuring device of claim 1, wherein said attenuation characteristics of said digital filters correspond respectively to time-varying noise components of said retrieved digital signals.

5. The force measuring device of claim 1, wherein said noise components are low frequency noise components.

6. The force measuring device of claim 1, wherein said force corresponds to weight of an object to be measured.

7. The force measuring device of claim 1, further comprising means coupled to said combining means for providing a display representative of said combined signal.

8. The force measuring device of claim 7, further comprising means for calculating a product of said combined signal and a predetermined unit price, and said display means being coupled to said calculating means for displaying a result of said calculated product.

* * * * *